June 24, 1947.  J. C. HOLTE  2,422,731
WHIFFLETREE HOOK
Filed Jan. 24, 1944
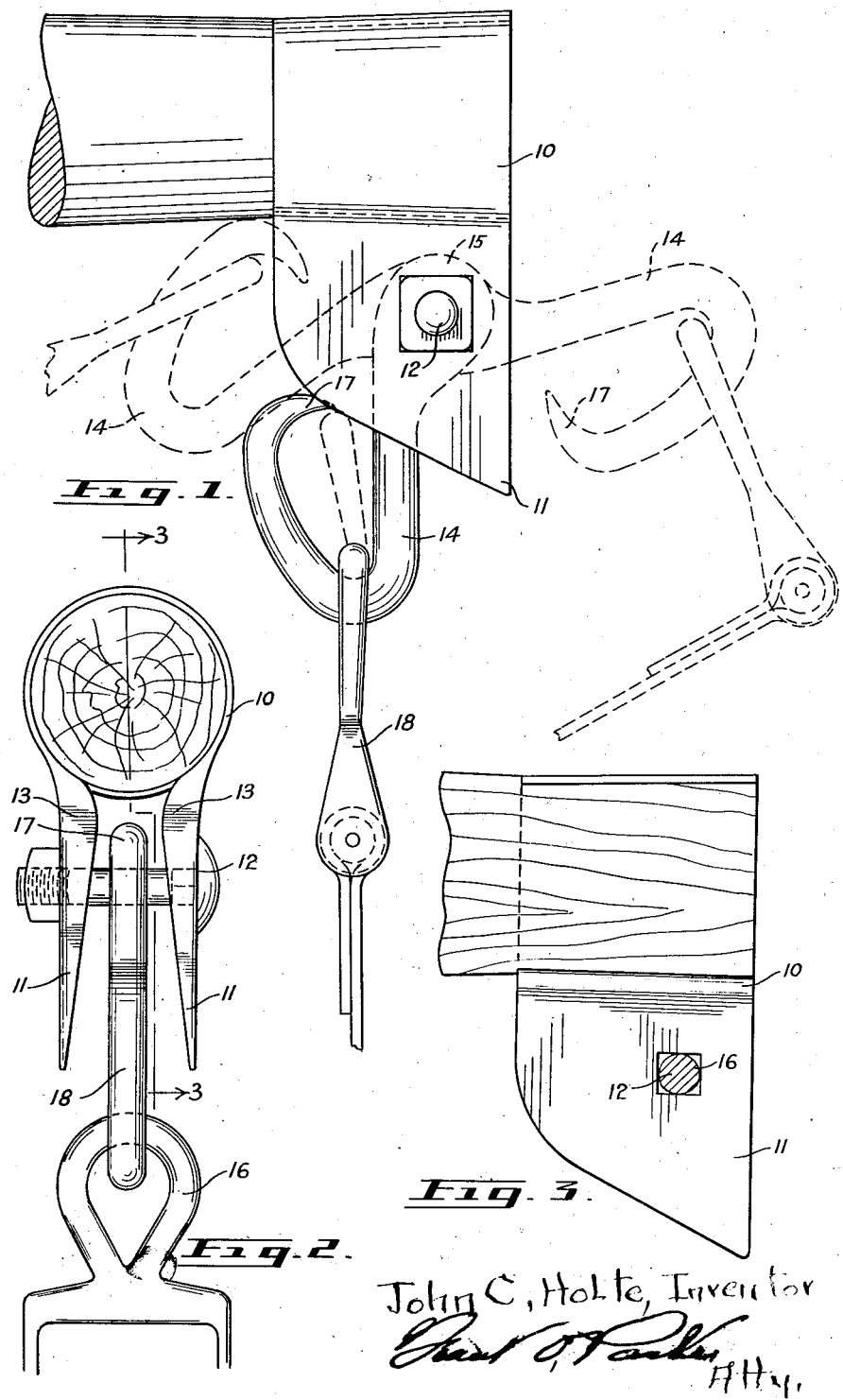
John C. Holte, Inventor Patented June 24, 1947

2,422,731

UNITED STATES PATENT OFFICE 2,422,731

WHIFFLETREE HOOK

John C. Holte, Edmonton, Alberta, Canada

Application January 24, 1944, Serial No. 519,575

1 Claim. (Cl. 278—115)

This invention relates to appliances for horse-drawn vehicles and more particularly to a whiffletree hook for the attachment thereto of tugs of harness traces.

The invention has, for one of its important objectives, the provision of a hook of the type described which will maintain a positive encirclement of the tug eye irrespective of the angle at which the tug is pulled against the hook or slackened off thus establishing a maximum of safety.

Another important object of the invention is to provide means for securing the hook to the whiffletree, the present means embodying the advantageous features of being easily attached to and removed from the whiffletree without weakening the end by piercing the wood in any manner, and by the provision of means for tightening the hook to the whiffletree when necessary.

Other objects of the invention are to provide an easily manufactured, inexpensive and durable device of the character set forth. It is simple to install and remove, easy to keep in repair.

With the above noted and other objects in view which may appear as the description proceeds the invention resides in the novel construction, combination and arrangement of cooperating parts as hereinafter more specifically set forth, claimed and shown in the accompanying drawings forming part of this application and in which:

Fig. 1 is a side elevational view of my invention attached to a whiffletree;

Fig. 2 is an end elevational view of the same;

Fig. 3 is a sectional view of the clamp taken along the line 3—3 of Fig. 2.

Referring more in detail to the drawings in which similar reference characters designate corresponding parts throughout the several views it will be seen that I have provided a clamp having an eye 10, which encircles the end of the whiffletree and is tightened thereon by drawing the two, coacting, depending lugs 11, toward each other by means of the nut and bolt 12, disposed through complementary orifices in each lug; as the lugs converge the circumference of the eye 10, is reduced. Of particular importance is the frustro conical shape of the eye in which the circumference of the inner edge is less than the circumference of the outer edge, this novel feature provides for an extremely positive grip of the clamp on the whiffletree and greatly reduces if not entirely removing the possibility of the clamp slipping off the end of the said whiffletree.

The joinder of the lugs and eye at 13, is thickened to prevent failure of the clamp at these critical points. From the foregoing description it will be seen that I am able to progressively increase the pressure with which the clamp grips the whiffletree should it become necessary to do so, which would not be the case if a fixed eye were employed, and this without weakening the whiffletree itself by piercing the end.

The whiffletree hook 14, is provided with an offset eye 15, which is pivotally attached to the bolt 12, between the lugs 11, of the clamp. The bolt is fixed in position by means of a square shoulder which is disposed in the square orifice 16, of one of the lugs. The hook is elongated, the tip 17, being directed sharply inward toward the shank in a shallow, downwardly curved direction. The offset eye together with the design of the hook assure that the edges of the lugs will always extend across the opening between the tip 17, and the shank of the hook under normal operating conditions so that the tug 18, cannot slip off the hook. The tug is attached to, and removed from the hook when the said hook is swung outward past the outer edge of the clamp 10, as shown in Figure 1.

It is believed that the construction and advantages of the device may be apparent from the foregoing paragraphs taken in conjunction with the accompanying drawings without further detailed description.

While the preferred embodiment of the invention has been disclosed it is understood that minor changes in the combination and arrangement of cooperating parts may be resorted to within the scope of what is claimed without departing from the spirit of the invention.

I claim:

A whiffletree hook comprising a frustro-conical split clamp adapted to encircle the end of a whiffletree, the ends of said clamp extending to form spaced co-acting lugs, the outer side edges of said lugs being of greater length than the inner side edges, a bolt extending through said lugs for securing said clamp in tight engagement with the whiffletree, a hook having a shank provided with an offset eye at its end for pivotal mounting on said bolt between the lugs of said clamp, the bill of said hook being reversely bent and extending in diverging relation to the shank with its free end curved inwardly towards said shank to lie between the lugs of said clamp during the normal swinging movement of said hook, said curved end of the bill being free of said lugs only when the hook is swung outwardly from the outer side edges of said lugs.

JOHN C. HOLTE.

REFERENCES CITED

The following references are of record in the file of this patent:

UNITED STATES PATENTS

| Number | Name | Date |
|---|---|---|
| 731,809 | Otterman | June 23, 1903 |
| 945,593 | Pierson | Jan. 4, 1910 |
| 616,805 | Reed | Dec. 27, 1898 |